United States Patent [19]

Hofmann et al.

[11] Patent Number: 4,765,688
[45] Date of Patent: Aug. 23, 1988

[54] ANTI-FRICTION BEARING FOR WHEELS OF AUTOMOTIVE VEHICLES

[75] Inventors: Heinrich Hofmann, Schweinfurt; Manfred Troster, Bad Kissingen, both of Fed. Rep. of Germany

[73] Assignee: FAG Kugelfischer Georg Schafer (KGaA), Fed. Rep. of Germany

[21] Appl. No.: 916,521

[22] Filed: Oct. 8, 1986

[30] Foreign Application Priority Data

Oct. 12, 1985 [DE] Fed. Rep. of Germany ....... 3536437

[51] Int. Cl.$^4$ .............................................. F16C 13/00
[52] U.S. Cl. ................................ 301/124 R; 384/504; 384/506; 384/544; 464/906
[58] Field of Search ............... 301/124 R, 124 H, 126, 301/131; 180/258, 259; 464/178, 906; 384/499, 504, 505, 506, 543, 544, 589

[56] References Cited

U.S. PATENT DOCUMENTS 4,010,986 3/1977 Otto ...................................... 384/478
4,090,751 5/1978 Krude ............................. 301/109 X
4,405,032 9/1983 Welschof et al. ............ 301/6 WB X
4,517,482 5/1985 Pfluger ............................ 384/506 X

FOREIGN PATENT DOCUMENTS 2499910 8/1982 France .

Primary Examiner—Robert B. Reeves
Assistant Examiner—Russell D. Stormer
Attorney, Agent, or Firm—Ostrolenk, Faber, Gerb & Soffen

[57] ABSTRACT

In order to keep at least part of the axial and tilting forces that act on a bearing away from the stub shaft supporting the bearing rollers, the inner ring of the bearing is constructed of two sections (2) (3) that support individual sets of ball bearings. The inner ring sections abut one another in a plane perpendicular to the bearing rotational axis. One of these inner ring sections (3) is force fitted on the stub shaft at the free end thereof and has a larger cross section than the other inner ring section (2). A necked-down bolt and mating closure nut, the latter being adjacent inner ring section (3), cooperate to maintain the other bearing elements assembled in operative relationship.

14 Claims, 1 Drawing Sheet

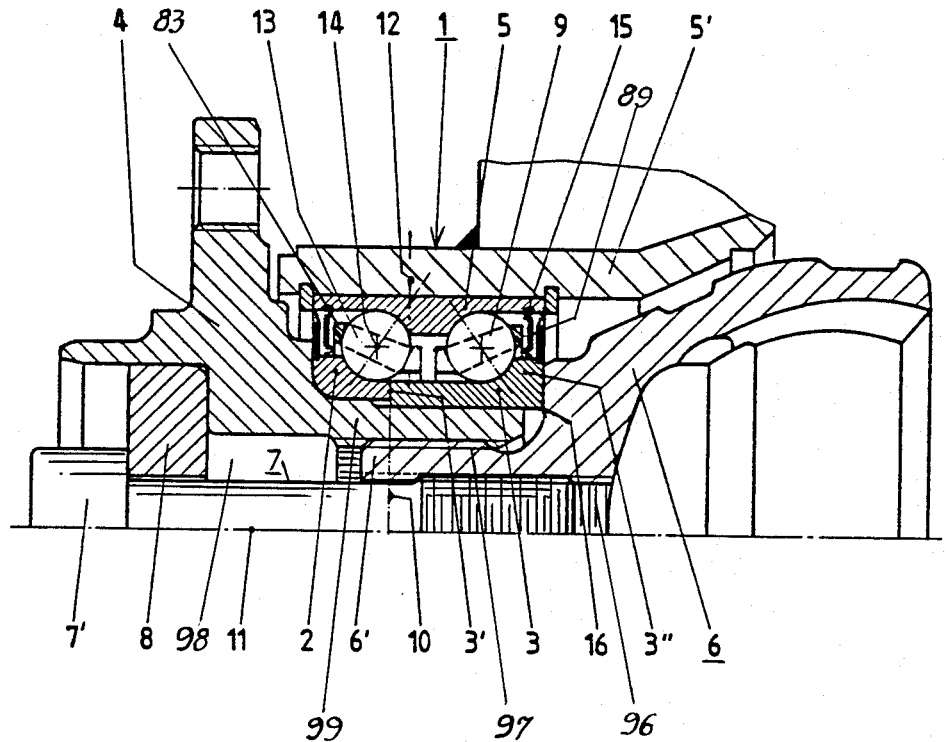

ANTI-FRICTION BEARING FOR WHEELS OF AUTOMOTIVE VEHICLES

BACKGROUND OF THE INVENTION

The present invention refers to an anti-friction bearing, and more particularly relates to a construction having two sets of balls mounted on a stub shaft in such a way that the latter is not subjected to all of the axial and tilting forces that are applied to the bearing.

Italian Patent No. 679,724 discloses a bearing having two sets of axially spaced balls. In order to be able to handle tilting and axial forces reliably, the bearing of the Italian Patent No. 679,724 includes a central screw, a stub shaft and a nut, all of large cross-section. This results in a relatively rigid construction. However, the closure nut that holds the bearing elements together can become loose relatively easily, especially when the bearing is subjected to the eccentric axial forces which occur when travelling around curves.

SUMMARY OF THE INVENTION

In order to overcome the disadvantages of the prior art, the instant invention provides a construction that utilizes a relatively flexible necked-down bolt to secure the bearing elements in operative positions on a stub shaft that projects from a hub and is isolated from at least part of the tilting and axial forces to which the bearing is subjected. The inner bearing ring is constructed of first and second abutting sections which support individual axially spaced sets of balls. Both of the inner ring sections are mounted on the stub shaft with the first section being force fitted on the stub shaft at the free end thereof and being engaged by a closure nut that is threaded on the necked-down bolt. The flexibility of the necked-down bolt provides an axial elastic clamping action between the bolt and closure nut thereby obviating the need of an additional locking means which would serve to add weight to the bearing unit.

Compared to the second inner ring section, the first inner ring section has a larger cross section in an axial plane, has a smaller central bore and is wider in an axial direction. The inner ring sections abut in a plan perpendicular to the rotational axis and located between a plane containing the centers of the balls supported by the second inner ring section and a plane that is contacted by the outside of the balls and is located between the abutment plane and the closure nut.

OBJECTS OF THE INVENTION

Accordingly, a primary object of this invention is to provide a bearing having two axially spaced sets of rollers that are operatively supported on a stub shaft in such a manner that the latter is not subjected to all of the axial and tilting forces acting on the bearing.

Another object of this invention is to provide a bearing having two axially spaced sets of rollers that are supported on individual removable inner ring sections one of which has a greater cross sectional area than the other section.

Still another object of this invention is to provide a bearing having two axially spaced sets of rollers that are supported on individual inner ring sections each having an axial bore that receives a stub shaft, with one of the axial bores being of greater diameter than the other axial bore.

A further object of this invention is to provide a bearing having two axially spaced sets of rollers that are supported on individual inner ring sections with one of the sections having a greater axial length than the other section.

A still further object of this invention is to provide a bearing having two axially spaced sets of rollers that are supported on individual inner ring sections, with a necked-down bolt being utilized to maintain the bearing elements assembled in their operative positions.

BRIEF DESCRIPTION OF THE DRAWING

These objects as well as other objects of this invention shall become readily apparent after reading the following description of the accompanying drawing in which the single FIGURE is a partial cross-section through an axial plane of an anti-friction bearing intended for use with wheels of automotive vehicles.

DETAILED DESCRIPTION OF THE PREFERRED EMBODIMENT

The drawing illustrates double-row angular-contact ball bearing 1 which includes two radially inner ring sections 2 and 3 arranged on stub shaft 99 formed as an axial projection of hub 4. The latter rotatably supports outer ring 5 that is mounted in housing 5'. Right inner ring section 3 is press fitted to the outside of stub shaft 99 and faces closure nut 6 which is in the form of a constant-velocity joint. The latter includes leftward axial extension 6' whose outer surface is provided with parallel axial grooves which engage complementary grooves in the central bore 98 of stub shaft 99 to form splined connection 97 between nut 6 and hub 4. Threaded central bore 96 of nut extension 6' is in threaded engagement with necked-down bolt 7 having head 7', and washer 8 is interposed between hub 4 bolt head 7' and hub 4.

Balls 13 held in a circular array by cage 83 constitute a row of ball bearings that is interposed between inner ring section 2 and outer ring 5. Similarly, balls 9 held in a circular array by cage 89 constitute a row of ball bearings that is interposed between inner ring section 3 and outer ring 5.

Right inner ring section 3 has a larger cross-section than left inner ring section 2, the former being greater in axial width and smaller in diameter than the latter. The relatively large press seat between right inner ring section 3 and stub shaft 99 means that a large portion of the axial and tilting forces which are transmitted through the right set of balls 9 is conducted directly from inner ring section 3 to hub 4. This also serves to substantially reduce forces and moments which are transmitted through closure nut 6 to necked-down bolt 7. Because of this arrangement, smaller parts may be used which, in the final analysis, also leads to a saving in weight.

The greater width of right ring section 3 in bearing 1 is obtained by extending the left face 3' of section 3 up to a plane 10 which is perpendicular to central axis 11 of the bearing 1 and lies in the space between the plane containing the ball centers 14 of the left set of balls 13 and its right axial envelope plane 12. At the right side of inner ring section 3, a widening of shoulder 3" permits relatively wide packings 15 to be installed.

To further improve the loading condition for necked-down bolt 7 over the improvement obtained by merely reducing the bore diameter of ring section 3, particularly in view of the tilting forces to which bearing 1 is frequently subjected, edge 16, where the axial bore of section 3 meets the right end of section 3, is provided with a radius which approaches zero. Because of this, these tilting forces act through a relatively short lever arm.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. An anti-friction bearing including:

outer ring means, inner ring means, axially spaced first and second sets of rollers interposed between said inner and outer ring means, a hub having an axial projection supporting said inner ring and having an axial passage, a bolt entered into said passage through one end thereof, and a closure member at the other end of said passage in operative engagement with said bolt;

said inner ring means including a first ring section supporting said first set of rollers and a second ring section supporting said second set of rollers;

said first and second ring sections being constituted by separable elements;

said first ring section being interposed between said second ring section and said closure member;

said first ring section having a larger axial cross section than said second ring section;

said first and second ring sections being provided with axial first and second bores, respectively, into which said projection is entered;

said first bore being of slightly smaller diameter than said second bore; the thickness of said first ring section measured in a radial direction being slightly greater than that of said second ring section.

2. An anti-friction bearing as set forth in claim 1 in which said first ring section has an end surface remote from said second ring section;

said first bore extending to said end surface and meeting same at an edge having a radius of rounding that approaches zero;

said closure member engaging said end surface at portions thereof adjacent to said edge.

3. An anti-friction bearing as set forth in claim 1 in which said bolt includes an axial portion disposed within said passage, and there is a substantial space between the outside of the axial portion of said bolt and a boundary wall which defines said passage.

4. An anti-friction bearing as set forth in claim 3 in which said closure member includes a hollow necked-down portion that extends into said passage and is provided with internal threads in operative engagement with said bolt.

5. An anti-friction bearing including:

outer ring means, inner ring means, axially spaced first and second sets of rollers interposed between said inner and outer ring means, a hub having an axial projection supporting said inner ring and having an axial passage, a bolt entered into said passage through one end thereof, and a closure member at the other end of said passage in operative engagement with said bolt;

said inner ring means including a first ring section supporting said first set of rollers and a second ring section supporting said second set of rollers;

said first ring section being interposed between said second ring section and said closure member;

said first ring section having a larger axial cross section than said second ring section;

said first and second ring sections being engaged at a first plane that is perpendicular to the rotational axis of said bearing;

said second set of rollers being comprised of balls as rolling elements;

said first plane being parallel to and disposed between a second and a third plane;

said balls having their centers disposed in said second plane;

said balls having their outer surfaces in contact with said third plane;

said third plane being interposed between said first plane and the other end of said passage.

6. An anti-friction bearing as set forth in claim 5 in which said first and second ring sections are provided with axial first and second bores, respectively, into which said projection is entered;

said first bore being of slightly smaller diameter than said second bore.

7. An anti-friction bearing as set forth in claim 5 in which the thickness of said first ring section measured in a radial direction is slightly greater than that of said second ring section.

8. An anti-friction bearing as set forth in claim 7 in which said first and second ring sections are provided with axial first and second bores, respectively, into which said projection is entered;

said first bore being of slightly smaller diameter than said second bore.

9. An anti-friction bearing as set forth in claim 5 in which the thickness of said first ring section measured in a radial direction is slightly greater than that of said second ring section.

10. An anti-friction bearing as set forth in claim 9 in which said first and second ring sections are provided with axial first and second bores, respectively, into which said projection is entered;

said first bore being of slightly smaller diameter than said second bore.

11. An anti-friction bearing as set forth in claim 9 in which the thickness of said first ring section measured in a radial direction is slightly greater than that of said second ring section.

12. An anti-friction bearing as set forth in claim 11 in which said first and second ring sections are provided with axial first and second bores, respectively, into which said projection is entered;

said first bore being of slightly smaller diameter than said second bore.

13. An anti-friction bearing as set forth in claim 5 in which said first ring section has an end surface remote from said second ring section;

said first bore extending to said end surface and meeting same at an edge having a radius of rounding that approaches zero;

said closure member engaging said end surface at portions thereof adjacent to said edge.

14. An anti-friction bearing as set forth in claim 13 in which the thickness of said first ring section measured in a radial direction is slightly greater than that of said second ring section.

* * * * *